United States Patent [19]
Ray

[11] 3,956,600
[45] May 11, 1976

[54] WALL TELEPHONE CADDY

[76] Inventor: Jimmie A. Ray, P.O. Box 922, Sebastopol, Calif. 94572

[22] Filed: Sept. 3, 1974

[21] Appl. No.: 502,376

[52] U.S. Cl. .............................................. 179/146 R
[51] Int. Cl.² ............................................ H04M 1/06
[58] Field of Search ................................. 179/146 R

[56] References Cited
UNITED STATES PATENTS 2,639,334  5/1953  Fleming ........................ 179/146 R
2,924,671  2/1960  Barry .............................. 179/146 R Primary Examiner—William C. Cooper
Attorney, Agent, or Firm—Jimmie A. Ray

[57] ABSTRACT

A wall telephone caddy comprises a cradle mounted on a wall in proximity with a wall telephone for removably supporting the handset of the telephone to keep the line open during the period that the called party is being sought.

2 Claims, 2 Drawing Figures

WALL TELEPHONE CADDY

DESCRIPTION OF THE INVENTION

The present invention relates to a wall telephone caddy. More particularly, the invention relates to a wall telephone caddy for supporting a wall telephone handset during the period between the answering of a call by a party other than the called party and the time that the called party picks up the handset.

Objects of the invention are to provide a wall telephone caddy of simple structure, which is inexpensive in manufacture, installed with facility and convenience adjacent new and existing wall telephones, used with facility and convenience, and functions efficiently, effectively and reliably to removably support the handset of the wall telephone to keep the line open during the period that the called party is being sought.

Figure 1:
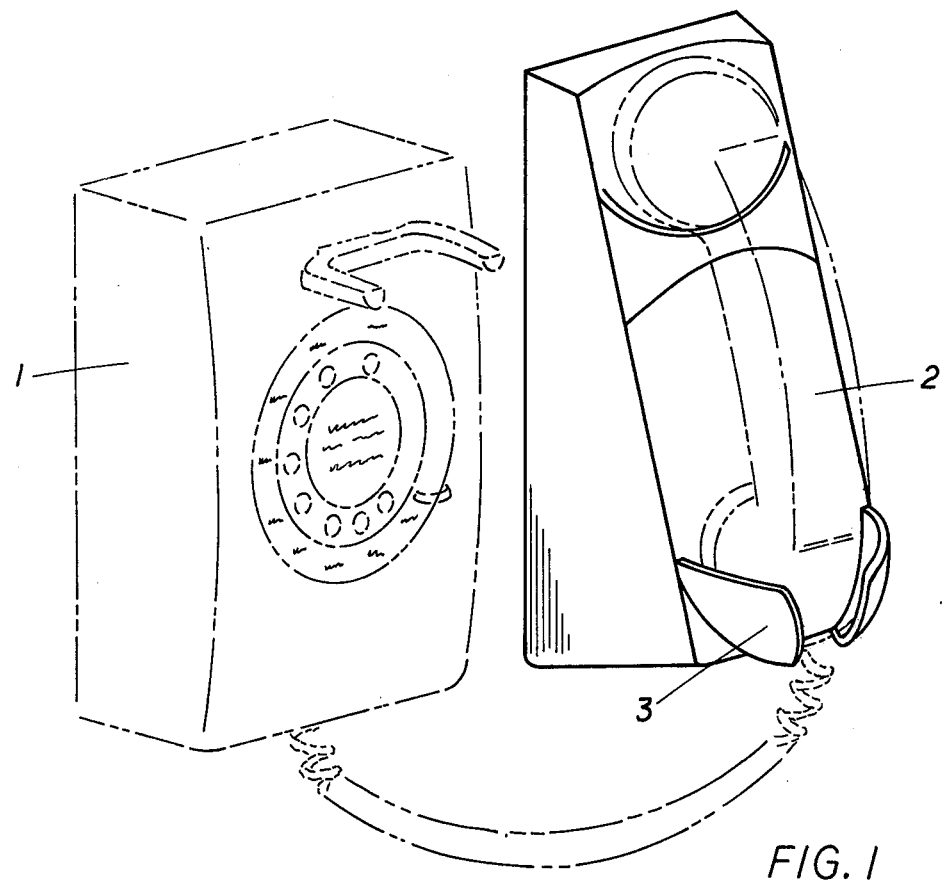
Figure 2:
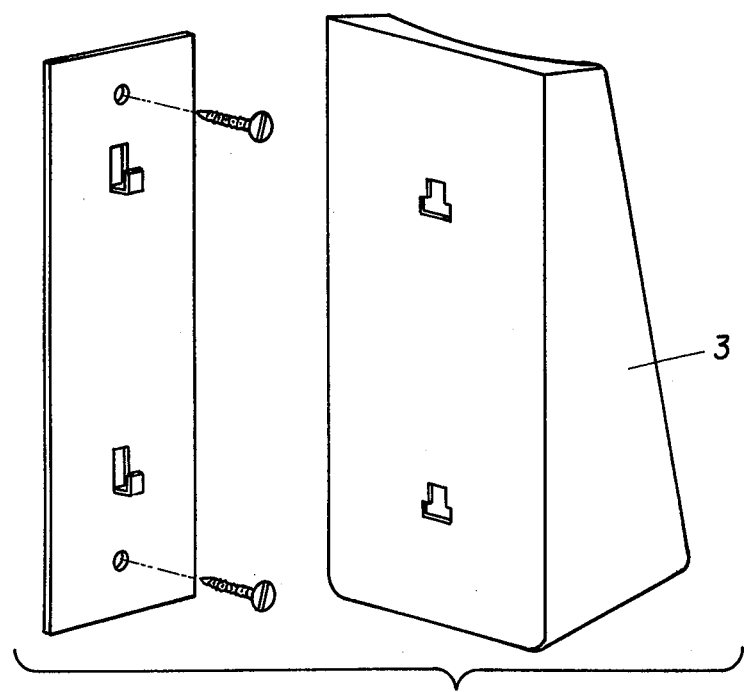

In order that the invention may be readily carried into effect, it will now be described with reference to the accompanying drawing, wherein:

FIG. 1 is a schematic diagram of an embodiment of the wall telephone caddy of the invention; and FIG. 2 is a schematic diagram illustrating the mounting of the wall telephone caddy of the invention on a wall.

In the FIGS., the same components are identified by the same reference numerals.

The wall telephone caddy of the invention supports a wall telephone 1 handset 2 during the period between the answering of a call by a party other than the called party and the time that the called party picks up the handset.

The wall telephone caddy of the invention comprises a cradle 3 mounted on a wall in proximity with a wall telephone 1 for removably supporting the handset 2 of the telephone to keep the line open during the period that the called party is being sought.

Anyone using a wall telephone, who desires to conveniently place the handset without closing a telephone line connection with a calling party, or with a called party, must either let the handset dangle, place it on any convenient object, or permit it to fall to the floor. The caddy of the invention removably supports the handset for any periods of time that the line is kept open. Such periods of time include those during which a called party is being sought by the person who answered the phone.

While the invention has been described by means of a specific example and in a specific embodiment, I do not wish to be limited thereto, for obvious modifications will occur to those skilled in the art without departing from the spirit and scope of the invention.

I claim:

1. A telephone caddy comprising:
   a. a support member having means mounting same on a vertical wall and having a substantially planar front face rearwardly inclined from bottom to top;
   b. a pair of cupped brackets mounted to a lower portion of said forward face, said cupped brackets being contoured to embrace the microphone end of a telephone handset and being laterally spaced to provide clearance for a line connected to said headset; said forward face having an arcuate upwardly concave shoulder on an upper portion thereof spaced from said cupped bracket to define a support for the speaker end of a telephone handset, whereby a handset placed on the inclined face of said caddy will be supported at both the microphone and speaker ends thereof.

2. Structure according to claim 1 wherein said mounting means comprises a mounting plate fastened to a wall, said mounting plate having a plurality of hook elements projecting forwardly therefrom, and said support member including a planar rear wall having a plurality of apertures therein spaced to engage said hook elements, whereby said support member is removably mounted to said plate.

* * * * *